(12) United States Patent
Yang et al.

(10) Patent No.: US 6,562,078 B1
(45) Date of Patent: May 13, 2003

(54) ARRANGEMENT AND METHOD FOR INPUTTING NON-ALPHABETIC LANGUAGE

(75) Inventors: Yongqi Yang, Bellevue, WA (US); Dong Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/342,979

(22) Filed: Jun. 29, 1999

(51) Int. Cl.[7] .............................................. G06F 15/00
(52) U.S. Cl. ..................... 715/535; 345/171; 341/23; 341/28
(58) Field of Search ........................ 707/535; 341/28, 341/23; 345/171, 703, 168, 172; 382/85; 715/535

(56) References Cited

U.S. PATENT DOCUMENTS

| | | | | |
|---|---|---|---|---|
| 4,879,653 A | * | 11/1989 | Shinoto | 400/109 |
| 5,128,672 A | * | 7/1992 | Kaehler | 341/23 |
| 5,319,386 A | * | 6/1994 | Gunn et al. | 345/171 |
| 5,574,482 A | * | 11/1996 | Niemeier | 345/168 |
| 5,717,425 A | * | 2/1998 | Sasaki | 345/157 |
| 5,952,942 A | * | 9/1999 | Balakrishnan et al. | 341/20 |
| 5,963,671 A | * | 10/1999 | Comerford et al. | 382/230 |
| 6,005,498 A | * | 12/1999 | Yang et al. | 341/23 |
| 6,073,146 A | * | 6/2000 | Chen | 704/3 |
| 6,170,000 B1 | * | 1/2001 | Bories et al. | 345/171 |
| 6,346,990 B1 | * | 2/2002 | Watanabe et al. | 358/1.11 |
| 6,404,418 B1 | * | 6/2002 | Leem | 345/188 |

OTHER PUBLICATIONS

N.P. Archer, M.W.L. Chan, S.J. Huang, and R.T. Liu, A Chinese–English Micro–Computer System, Communications of the ACM, Aug. 1988, vol. 31, No. 8, pp. 988–982.*
Jian Sheng, A Pinyin Keyboard for Inputting Chinese Characters, IEEE Computer, Jan. 1985, pp. 60–63.*
"An Intelligent, Knowledge–Based Chinese Input System" by A. Chiu and F. Wong, Computer Processing of Chinese & Oriental Languages, vol. 3, No. 1, May 1987.*
"Pinyin for the PC" by Raymond A. Rogers, PC World, Jun. 1984, pp. 285–288.*
Evaluation of Chinese Input Methods by Cheng–Kuang Chen and Reng–Weng Gong, Computer Processing of Chinese and Oriental Languages, vol. 1, No. 4, Nov. 1984, pp. 236–247.*

* cited by examiner

Primary Examiner—Heather R. Herndon
Assistant Examiner—Charles Bieneman
(74) Attorney, Agent, or Firm—Lee & Hayes, PLLC

(57) ABSTRACT

A double-spelling soft keyboard is used to input characters in a non-alphabetic language, such as Chinese. These characters are represented by a combination of one or more of an initial sound, a final sound, and a tone. An initial soft keyboard allows the user to select the initial sound, if present. Based on which initial sound is selected, a final soft keyboard offers the user a choice of final sounds that combine to form valid characters with the initial sound. Tone information may also be supplied by the user. Based on the initial sound, the final sound, and/or the tone, the desired character is predicted. This prediction can also be informed by contextual information, linguistic patterns, and the user's previous input.

82 Claims, 16 Drawing Sheets

| Initial | b | c | ch | d | f | g | h | j | k | l | m |
|---|---|---|---|---|---|---|---|---|---|---|---|
| Final | a | a | a | a | a | a | a | i | a | a | a |
| Final | ai | ai | ai | ai | ai | an | ai | ai | ia | ai | ai | ai |
| Final | an | an | an | an | an | ang | an | an | ian | an | an | an |
| Final | ang | ang | ang | ang | ang | ei | ang | ang | iang | ang | ang | ang |
| Final | ao | ao | ao | ao | ao | en | ao | ao | iao | ao | ao | ao |
| Final | e | ei | e | e | e | eng | e | e | ie | e | e | e |
| Final | ei | en | en | en | ei | o | ei | ei | in | en | ei | ei |
| Final | en | eng | eng | eng | eng | ou | en | en | ing | eng | eng | en |
| Final | er | i | i | i | i | u | eng | eng | iong | ong | i | eng |
| Final | eng | ian | ong | ong | ia | | ong | ng | iu | ou | ia | i |
| Final | o | iao | ou | ou | ian | | ou | ong | u | u | ian | ian |
| Final | ou | ie | u | u | iao | | u | ou | uan | ua | iang | iao |
| Final | | in | uan | uai | ie | | ua | u | ue | uai | iao | ie |
| Final | | ing | ui | uan | ing | | uai | ua | un | uan | ie | in |
| Final | | o | un | uang | iu | | uan | uai | | uang | in | ing |
| Final | | u | uo | ui | ong | | uang | uan | | ui | ing | iu |
| Final | | | | un | ou | | ui | uang | | un | iu | o |
| Final | | | | uo | u | | un | ui | | uo | o | ou |
| Final | | | | | uan | | uo | un | | | ong | u |
| Final | | | | | ui | | | uo | | | ou | |
| Final | | | | | un | | | | | | u | |
| Final | | | | | uo | | | | | | uan | |
| Final | | | | | | | | | | | ue | |
| Final | | | | | | | | | | | un | |
| Final | | | | | | | | | | | uo | |
| Final | | | | | | | | | | | v | |

| Initial | n | p | q | r | s | sh | t | w | x | y | z | zh |
|---|---|---|---|---|---|---|---|---|---|---|---|---|
| Final | a | a | i | an | a | a | a | a | i | a | a | a |
| Final | ai | ai | ia | ang | ai | ai | ai | ai | ia | an | ai | ai |
| Final | an | an | ian | ao | an | an | an | an | ian | ang | an | an |
| Final | ang | ang | iang | e | ang | ang | ang | ang | iang | ao | ang | ang |
| Final | ao | ao | iao | en | ao | ao | ao | ei | iao | e | ao | ao |
| Final | e | ei | ie | eng | e | e | e | en | ie | i | e | e |
| Final | ei | en | in | i | en | ei | ei | eng | in | in | ei | ei |
| Final | en | eng | ing | ong | eng | en | eng | o | ing | ing | en | en |
| Final | eng | i | iong | ou | i | eng | i | u | iong | o | eng | eng |
| Final | i | ian | iu | u | ong | i | | ian | iu | ong | i | i |
| Final | ian | iao | u | uan | ou | ou | | iao | u | ou | ong | ong |
| Final | iang | ie | uan | ui | u | u | | ie | uan | u | ou | ou |
| Final | iao | in | ue | un | uan | ua | | ing | ue | uan | u | u |
| Final | ie | ing | un | uo | ui | uai | | ong | un | ue | uan | ua |
| Final | in | o | | | un | uan | | ou | | un | ui | uai |
| Final | ing | ou | | | uo | uang | | u | | | un | uan |
| Final | iu | u | | | | ui | | uan | | | uo | uang |
| Final | ong | | | | | un | | ui | | | | ui |
| Final | ou | | | | | uo | | un | | | | un |
| Final | u | | | | | | | uo | | | | uo |
| Final | uan | | | | | | | | | | | |
| Final | ue | | | | | | | | | | | |
| Final | uo | | | | | | | | | | | |
| Final | v | | | | | | | | | | | |

Fig. 8

| 1 | 2 | 3 | 4 | 5 | 6 | 7 | 8 | 9 | 0 |
|---|---|---|---|---|---|---|---|---|---|
| iu | ia | e | uan | ue | uai | u | | i | o |
| a | ong | iang | en | eng | ang | an | | ao | ai |
| ei | ie | iao | ui | ou | in | ian | | un | ing |
| Esc | 韵 | ⇧ | ·, | 半 | | Del | ← → | ←| | ↵ |

| - | ´ | ˇ | ` | 轻 | 6 | 7 | 8 | 9 | 0 |
|---|---|---|---|---|---|---|---|---|---|
| iu | ia | e | er | ue | uai | u | i | | o |
| a | iong | iang | en | eng | ang | an | ao | | ai |
| ei | ie | iao | ui | ou | in | ian | un | | ing |
| Esc | 韵 | ⇧ | ., | 半 | 确认 | Del | ← | → | ←| | ↵ |

| `  | 1 | 2 | 3 | 4 | 5 | 6 | 7  | 8  | 9 | 0 | -  | =     |
|----|---|---|---|---|---|---|----|----|---|---|----|-------|
| Cap| Q | W | E | R | T | Y | SH | CH | ' | P | [  | ]     |
|Shift| A | S | D | F | G | H | J  | K  | L | ; | '  | Enter |
| Ctrl| Z | X | C | ZH| B | N | M  | ,  | . | / | \  | BK    |
| /  | / | / |   | Space |  |  | Del| ↑ | ↓ | ← | →  | ESC   |

| ~ | ! | @ | # | $ | % | ^ | & | * | ( | ) | _ | - |
|---|---|---|---|---|---|---|---|---|---|---|---|---|
| Cap | Q | W | E | R | T | Y | SH | CH | ` | P | { | } |
| Shift | A | S | D | F | G | H | J | K | L | : | " | Enter |
| Ctrl | Z | X | C | ZH | B | N | M | < | > | ? | \| | BK |
| / | / | / | | Space | | | Del | ↑ | ↓ | ← | → | ESC |

| | iu | ia, ua | e | uan, er | ue | uai, v | u | i | o, uo | un | [ | ] |
|---|---|---|---|---|---|---|---|---|---|---|---|---|
| | a | ong, iong | uang, iang | en | eng | ang | an | ao | ai | ing | ' | Enter |
| | ei | ie | iao | ui, v | ou | in | ian | | | | | BK |
| | | | Space | | | | Del | ↑ | ↓ | ← | → | ESC |

Fig. 15

|   |   |   |   |   |   | u |   | o |   | [ | ] |
|---|---|---|---|---|---|---|---|---|---|---|---|
|   | a |   |   | en | eng | ang | an |   | ai | ' | Enter |
|   | ei |   |   |   |   |   |   |   |   |   | BK |
|   |   |   | Space |   |   |   | Del | ↑ | ↓ | ← | → | ESC |

Fig. 16

ARRANGEMENT AND METHOD FOR INPUTTING NON-ALPHABETIC LANGUAGE

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 1999, Microsoft, Inc.

TECHNICAL FIELD OF THE INVENTION

The present invention pertains generally to user input arrangements for use with computer devices, and more particularly to input arrangements for use with hand-held computer devices.

BACKGROUND OF THE INVENTION

Non-alphabetic languages, i.e., languages not based on the Roman alphabet, are often characterized by a relatively large number of characters. The English language features twenty-six letters that combine to form words. By comparison, the Chinese language features thousands of ideograms (called Chinese characters) that represent entire words; each character is formed from units known as radicals, of which hundreds exist. Due to the large number of characters in the Chinese language, many early approaches for inputting Chinese characters into computer systems involved large, unwieldy keyboards with many keys. Advances in Chinese computer technology have been accompanied by improvements in Chinese input approaches.

These approaches can be categorized into two types. One type is radical-based and involves mapping the set of radicals to the standard English keyboard. The other type involves the use of a phonetic scheme known as Pinyin, which has long been used to represent Chinese characters. In this Pinyin-based scheme, each Chinese character is assigned a Romanized representation derived from a phonetic spelling of its pronunciation. The Pinyin representation of a Chinese character, therefore, can be broken down into phonemes identical to the Roman alphabet. Additionally, tonal information can be conveyed using diacritical marks.

Although inputting characters using a Pinyin-based scheme is fairly accurate, the process is tedious, especially when used in conjunction with small soft-keyboards. The Pinyin representation of each character requires one to six keystrokes without tonal information; conveying tonal information adds another keystroke.

In order to decrease the number of keystrokes required for inputting Pinyin representations of Chinese characters, some desktop input methods, or IME's, use a double-spelling scheme that divides a Pinyin representation into an initial sound and a final sound. These schemes typically map a standard English keyboard layout to a double-spelling layout and reduce the number of keystrokes involved in inputting each character to two or three. To use this scheme effectively, however, the user must learn and memorize the double-spelling layout. In addition, each key may be mapped to more than one initial or one final sound, and there is no standard mapping scheme. As a result, little significant advantage is realized over fully spelling out Pinyin representations. Further, existing double-spelling schemes are inadequate for use with handheld computing devices, which typically lack a physical keyboard.

While these approaches are suitable for use in desktop computing environments, they are unsuitable for use in hand-held computing environments, which by their nature cannot use large input devices, such as a PC keyboard. Indeed, hand-held computers typically use touch-sensitive screens and graphical user interfaces (GUIs) known as soft keyboards to receive input.

In this context, a soft keyboard is a graphical representation of a keyboard displayed on a touch sensitive screen. To input letters or other characters using a soft keyboard, the user touches the appropriate keys on the graphic keyboard with a stylus or other object. Because soft keyboards are limited to the size of the display screen and are therefore typically quite small, they cannot implement a large number of keys.

Handwriting recognition techniques have also been used to provide input to hand-held computers. This approach can be reasonably accurate for languages using the Roman alphabet due to the relatively simple nature of the constituent letters. For Chinese and other languages that do not use the Roman alphabet, however, this approach can suffer losses in both speed and accuracy. For example, in the Chinese language, many characters are somewhat complex and can require as many as twenty strokes to input. The number of strokes involved in inputting a character makes the process an inefficient one. In addition, imprecise strokes can cause the wrong character to be rendered. Further, some users only know how to pronounce characters and not how to write them. For these reasons, handwriting recognition has not adequately addressed the issue of inputting Chinese characters.

Using conventional input techniques, inputting Chinese characters continues to present a significant speed obstacle to computer processing. Accordingly, a need continues to exist for an accurate, efficient approach to inputting characters in languages not based on the Roman alphabet that is suitable for use with a hand-held computer.

SUMMARY OF THE INVENTION

According to various example implementations of the invention, there is provided a double-spelling soft keyboard that is used to input characters in a non-alphabetic language, such as Chinese, as described herein below. These characters are represented by a combination of an initial sound, a final sound, and/or a tone. In particular, the invention provides, among other things, for an initial soft keyboard that allows the user to select the initial sound, if present. Based on which initial sound is selected, a final soft keyboard offers the user a choice of final sounds that combine to form valid Pinyin representations of characters with the initial sound. Tone information may also be supplied by the user. After the initial sound, the final sound, and/or the tone have been input, i.e., after the complete Pinyin representation has been input, the desired character is predicted. This prediction can also be informed by contextual information, linguistic patterns, and the user's previous input.

One particular implementation is directed to a method for inputting a desired character in a non-alphabetic language. First, the user is presented with a graphical representation of an initial soft keyboard having a plurality of first keys. At least some of the first keys represent initial sounds. The user is then presented with a graphical representation of a final soft keyboard having a plurality of second keys. At least some of the second keys represent final sounds. Each of the second keys assumes either an enabled state or a disabled state, depending on a user selection of one of the first keys. The desired character is determined at least in part as a function of a user selection of one of the first keys and one of the second keys. According to one example implementation, the desired character is determined further based on the user selection of a tone or space key. In still another particular implementation, the user selects the desired character from a candidate or homophone list that appears.

In another implementation, a user is presented with a graphical representation of an initial soft keyboard having a plurality of first keys. At least some of the first keys representing initial sounds. The user is then presented with a graphical representation of a final soft keyboard having a plurality of second keys. At least some of the second keys represent final sounds. Each of the second keys assumes an enabled state or a disabled state, depending on a user selection of one of the first keys. A string is constructed at least in part as a function of a user selection of the first and second keys. A statistical language model is used to determine the desired character at least in part as a function of the string.

Other implementations are directed to computer arrangements and computer-readable media for implementing these methods.

Still another implementation is directed to a handheld computing device having a touch-sensitive screen and configured to receive input of a desired character in a non-alphabetic language by displaying on the touch-sensitive screen a graphical representation of an initial soft keyboard having a plurality of first keys. At least some of the first keys represent initial sounds. The handheld computing device receives a user selection of one of the first keys using the touch-sensitive screen. It then displays on the touch-sensitive screen a graphical representation of a final soft keyboard having a plurality of second keys. At least some of the second keys represent final sounds. Each of the second keys assumes an enabled state or a disabled state, depending on a user selection of one of the first keys. The handheld computing device receives a user selection of one of the second keys using the touch-sensitive screen. It then determines the desired character at least in part as a function of a user selection of one of the first keys and one of the second keys. In one example implementation, the desired character is determined further based on the user selection of a tone or space key. In another particular implementation, the user selects the desired character from a candidate or homophone list that appears. In still another example implementation, a string is constructed at least in part as a function of a user selection of the first and second keys. A statistical language model is used to determine the desired character at least in part as a function of the string, e.g., among candidates that correspond to the Pinyin string.

The above summary of the present invention is not intended to describe every implementation of the present invention. The figures and the detailed description that follow more particularly exemplify these implementations.

BRIEF DESCRIPTION OF THE DRAWINGS

FIG. 8 is an example table for use with determining valid combinations of initial and final sounds.

FIG. 9 depicts an example layout for a final soft keyboard, according to a particular operational example of the present invention.

FIG. 10 depicts an example layout for a soft keyboard for use in entering tone information.

FIG. 13 depicts an example layout for an initial soft keyboard, according to another embodiment of the present invention.

FIG. 14 depicts the layout of FIG. 13 in response to a Shift key being pressed.

FIG. 15 depicts an example layout for a final soft keyboard.

FIG. 16 depicts an example layout for a final soft keyboard, according to a particular operational example of the present invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
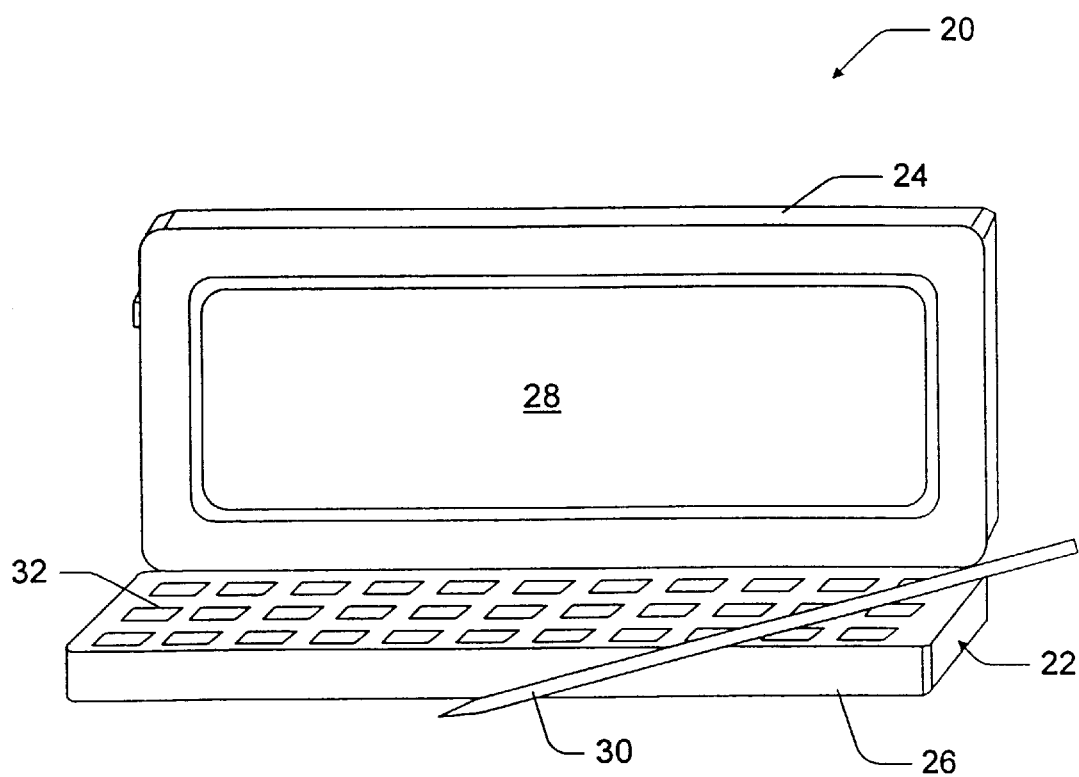
FIG. 1 is a diagram of the hardware and operating environment of a limited resource computer in conjunction with which embodiments of the invention may be practiced.

FIG. 1 is a diagram of resource-limited computer in which read-only applications are updated at run-time according to the various embodiments of the invention. The invention is described in the general context of computer-executable instructions, such as program modules, being executed by a computer, such as a personal computer. Generally, program modules include routines, programs, objects, components, data structures, etc., that perform particular tasks or implement particular abstract data types.

FIG. 1 illustrates a typical handheld personal computer (H/PC) 20 having limited computing resources. H/PC 20 has a casing 22 with a cover or lid 24 and a base 26. H/PC 20 has a liquid crystal display (LCD) 28 with a touch-sensitive screen mounted to the lid 24. The lid 24 is hinged to the base 26 so as to pivot between an open position, which exposes display 28, and a closed position, which protects the display. The H/PC 20 is equipped with a stylus 30 to enter data through the touch screen display 28 and a miniature keyboard 32. The stylus 30 and keyboard 32 are both mounted in base 26.

H/PC 20 can also be implemented with a wireless transceiver (not shown) such as an infrared transceiver and/or an radio frequency transceiver. Although the illustrated implementation shows a two-member H/PC 20 with a lid 24 and a base 26, other mechanical implementations of the H/PC might also be used.

Figure 2:
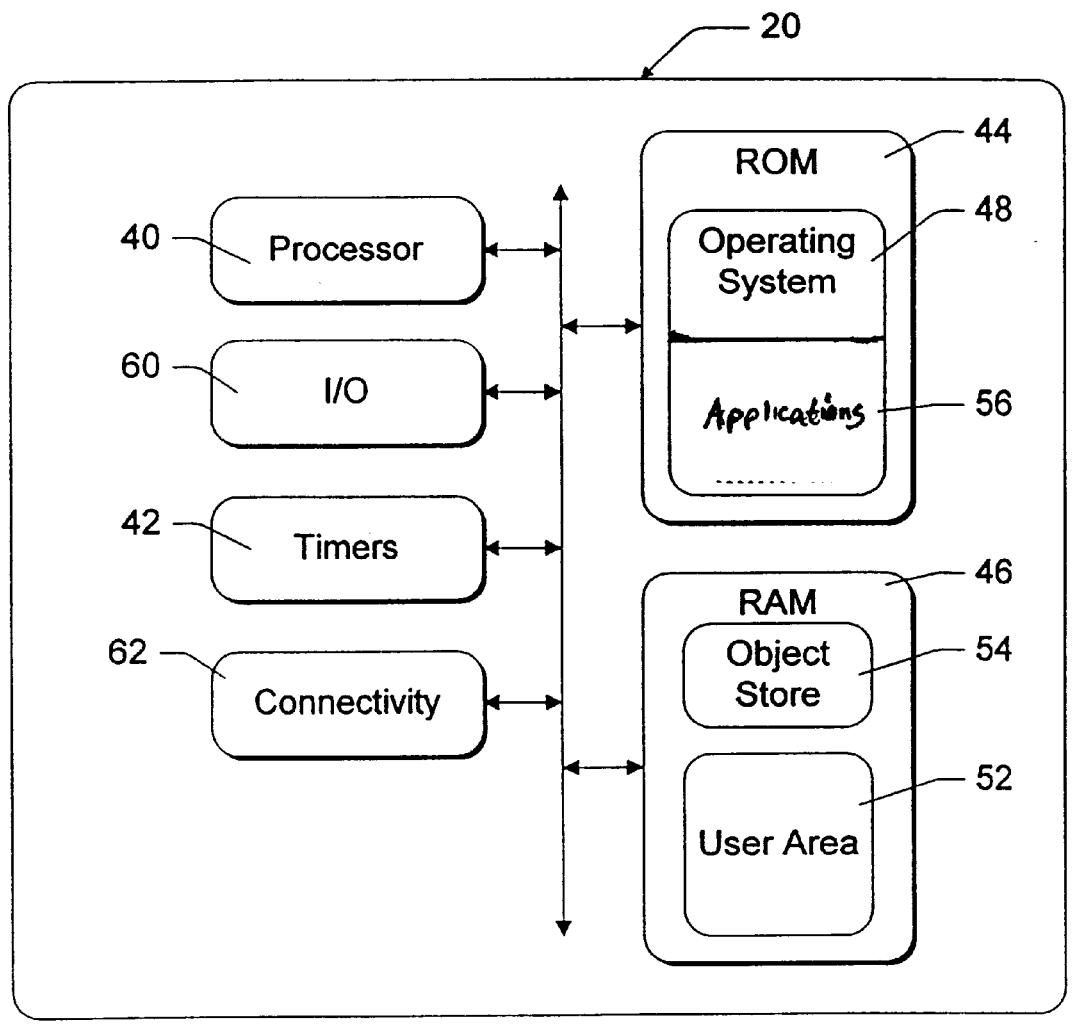
FIG. 2 is a block diagram showing functional components of the computer shown in FIG. 1.

FIG. 2 illustrates the primary functional components of the H/PC 20 shown in FIG. 1. The H/PC 20 includes microprocessor 40 that executes operating system 48. Processor 40 has three modes of operations: full-speed, standby and suspend. Full-speed mode is used to execute applications. Standby mode is used during brief idle periods. Suspend mode is used during long idle periods and uses less than one-thousandth of full speed power.

H/PC 20 includes timers 42 for providing interrupts and other timer events as well as the current date and time. Read-only memory (ROM) 44 stores operating system 48 as well as bundled applications 56. Random access memory (RAM) 46 includes user area 52 for executing user-installed applications and object store 54 for storing data. Object store 54 is used in place of conventional direct-access storage devices like disk and tape drives. In addition, object store 54 maintains a registry for H/PC 20. User input and output devices 60 communicate with external devices. Similarly, connectivity block 62 represents a number of standard connectivity devices such as a serial port, infrared communications hardware, etc.

The hardware and operating environment in conjunction with which embodiments of the invention may be practiced has been described. The following section provides a more detailed description of the embodiments of the inventive system.

System Level Overview

Figure 3:
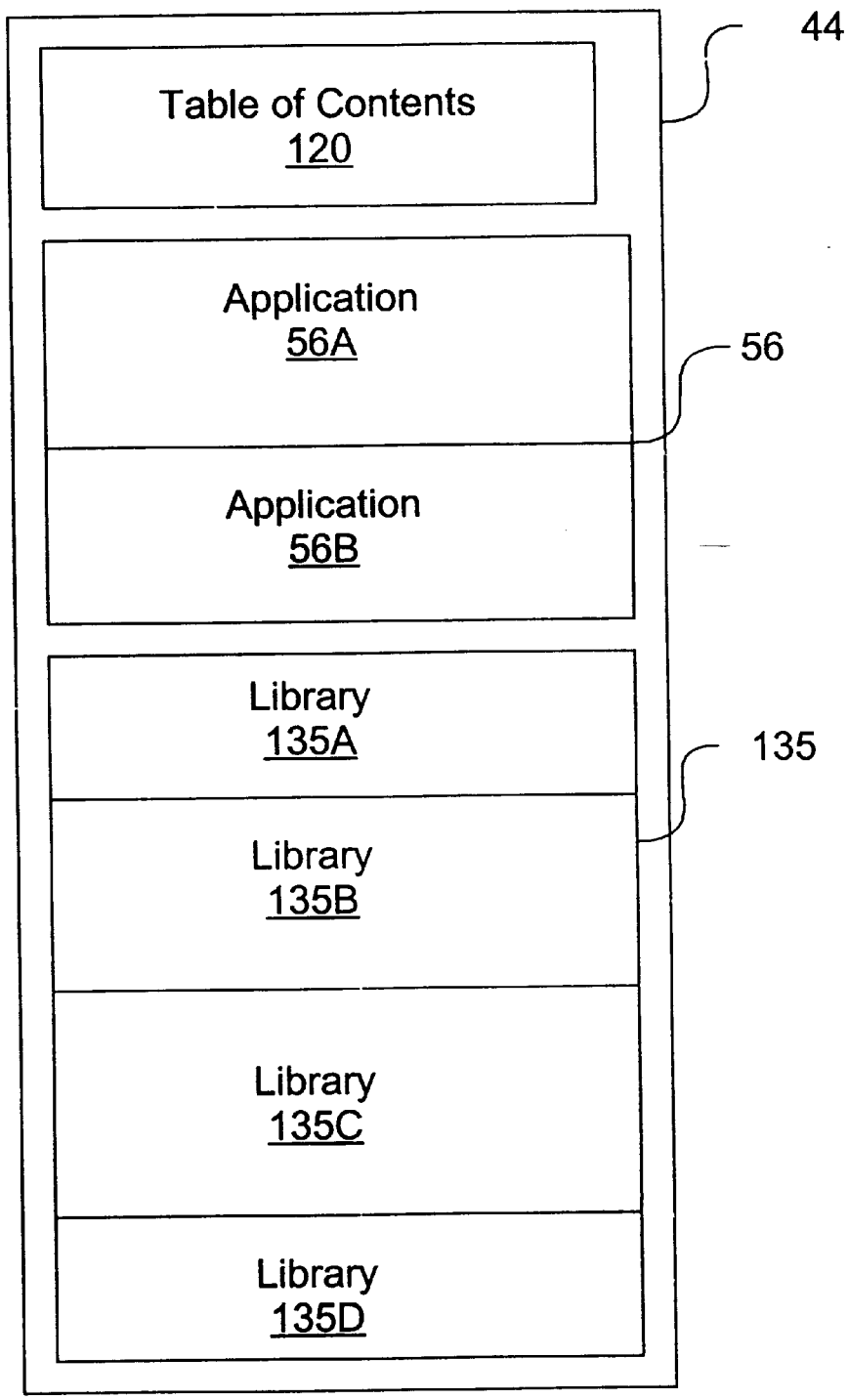
FIG. 3 is a block diagram illustrating one embodiment of a read-only device having executable software applications and shared libraries.

FIG. 3 illustrates one embodiment of a read-only memory (ROM) 44 having software applications 56 and shared libraries 135 stored therein. Read-only memory (ROM) 44 may be any memory-addressable device that is read-only or any device which only supports block writes such as flash memory, a flash memory card, etc.

Software applications 56 represent application programs, such as word processing software, that are stored in ROM 44 and which primarily execute from ROM 44 in order to increase initial execution speed and to conserve RAM 46. Libraries 135 are not stand-alone applications but are invoked by applications 56 or even by other libraries 135. For example, in one embodiment libraries 135 are dynamically linked libraries (DLL's). Within this application, the term software module includes both software applications 56 and libraries 135. Table of contents 120 lists all software applications 56 and libraries 135 stored within ROM 44 and provides a corresponding starting address for each software module.

As discussed above, in conventional resource-limited computing devices any change to libraries 135 often requires reprogramming or replacing the entire ROM 44. With consumer-oriented products, such as with palmtop and even laptop computers, this is especially problematic because it requires the user or a service technician to physically install a new ROM 44. A user cannot simply load a new version for one of the libraries 135 to hard disk drive 27 because all references to the replaced library 135 within ROM 44 will be unchanged and will incorrectly point to the old version. Thus, in conventional systems, users are forced to replace the entire read-only device, rewrite the entire device in the case of a flash memory device, or use the old versions of applications 56 and libraries 135.

In order to illustrate the invention, assume the user has installed a newer version of library 135D onto computer 20 and that software application 56A depends on library 135D. According to the invention, when software application 56A is to be executed, operating system 48 identifies libraries 135 on which the application 56 depends. After identifying all of the dependencies, operating system 48 determines whether a newer version of any of the identified libraries 135 has been installed on the computer 20. Thus, in this example operating system 48 determines that software application 56A depends on library 135D and that a newer version of library 135D has been loaded onto computer 20.

Because a new version of library 135D has been installed, operating system 48 updates application 56 and any other required libraries 135 that depend on library 135D such that they correctly reference the new library. More specifically, operating system 48 allocates one or more physical pages in RAM 46 and copies into RAM 46 a portion of application 56A that references library 135D. After copying the portion, operating system 48 modifies all references to point to the new version of library 135D. Operating system 48 repeats this process for each library 135 on which application 56A depends and that references the library 135D.

Figure 4:
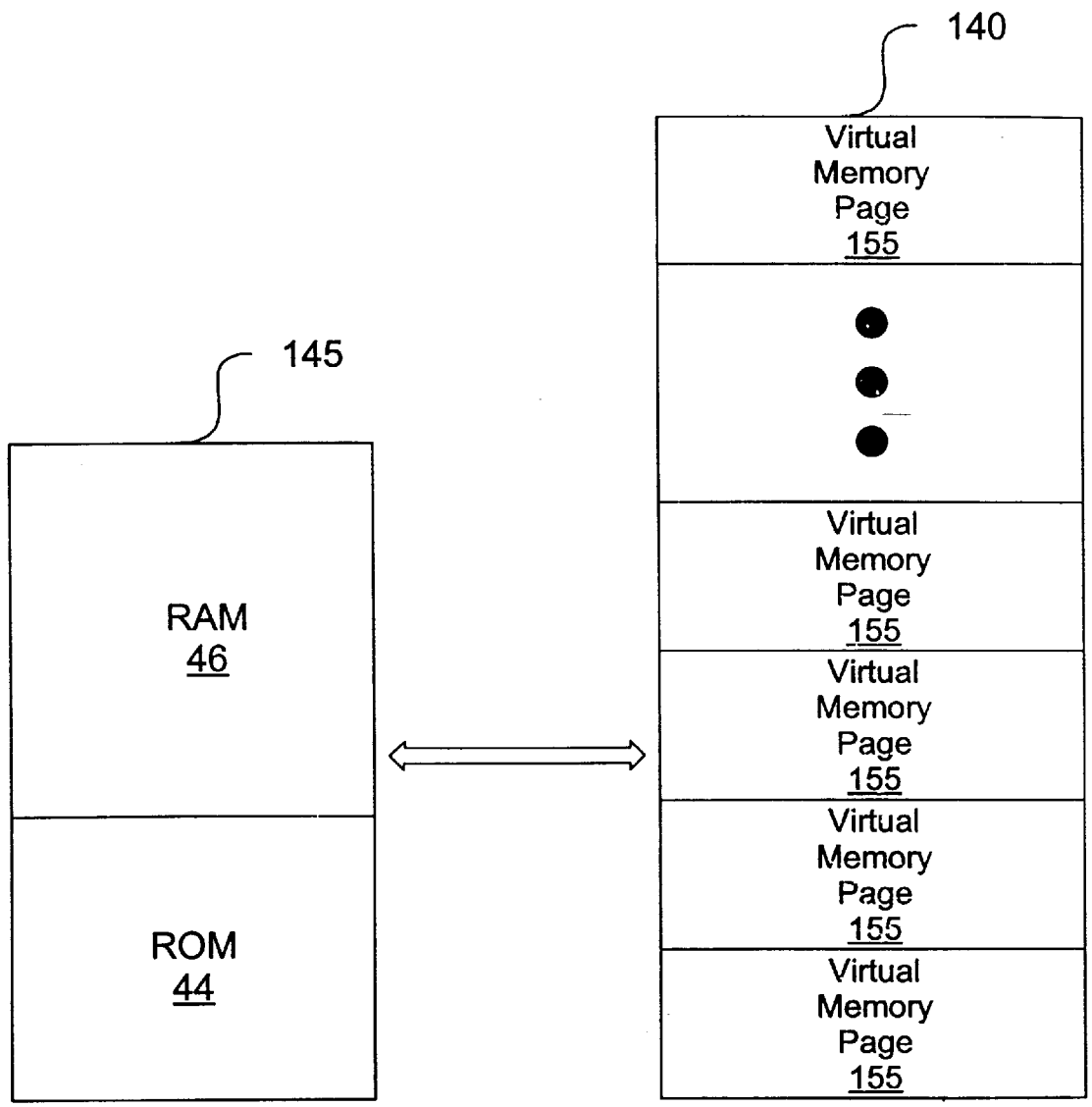
FIG. 4 is a block diagram that illustrates a mapping from virtual memory to physical memory that includes read-only memory (ROM) and random-access memory (RAM).

Next, operating system 48 executes software application 56A from both ROM 44 and RAM 46. In this manner, much of software application 56A is executed from ROM 44 while just the updated portion is executed from RAM 46. The updated libraries 135 are similarly executed. In this manner the invention facilitates updates to any of the libraries 135 contained within the ROM 44. If a new version for library 135D had not been installed then operating system 48 would have executed software application 56A directly from ROM 44 without modification. As illustrated in FIG. 4, in one embodiment operating system 48 includes a virtual memory (VM) system that maps virtual memory 140 to physical memory 145. More specifically, the VM system maps virtual memory pages 155 to physical pages located within either ROM 44 or RAM 46. In this embodiment, most of the virtual memory pages 155 that are allocated for executing applications 56 are mapped directly to the physical pages within the ROM 44. A small number of virtual memory pages 155, however, are allocated for the portions that have been modified in RAM 46. By using the VM system to map virtual memory pages to both ROM 44 and RAM 46, computer 20 can seamlessly execute applications 56 and libraries 135 with only initial modification to a small portion of the software.

Example Embodiments of the Invention

According to one particular embodiment of the present invention, characters in languages not based on the Roman alphabet, such as Chinese, are input into a handheld computing device using a phonetic spelling scheme. It will be appreciated that, although the example embodiments are described in the context of inputting Chinese characters, the present invention is equally applicable to inputting characters in other languages not based on the Roman alphabet, and the invention is not limited in application to input of Chinese characters.

In this particular context, Chinese characters are input into a handheld computing device using a combination of keystrokes entered using a soft keyboard. Specifically, the Pinyin representation of the desired character is input as a combination of an initial keystroke, and a final sound. The initial keystroke usually, but not always, represents an initial sound. Further, a third keystroke representing the tone of the character is optionally input. The present invention maps the keystroke combination to a most probable character based on the Pinyin representation and, optionally, further based on contextual information.

As discussed above, Pinyin is a phonetic scheme used to represent characters in the Chinese language. Each Pinyin representation of a character consists of one or two components. One is an initial or consonant sound. The other is a final or vowel sound. For example, the Pinyin representation "ming" can be broken down into the initial sound "m" and the final sound "ing." Some characters, such as "ang," lack the initial sound.

Figure 5:
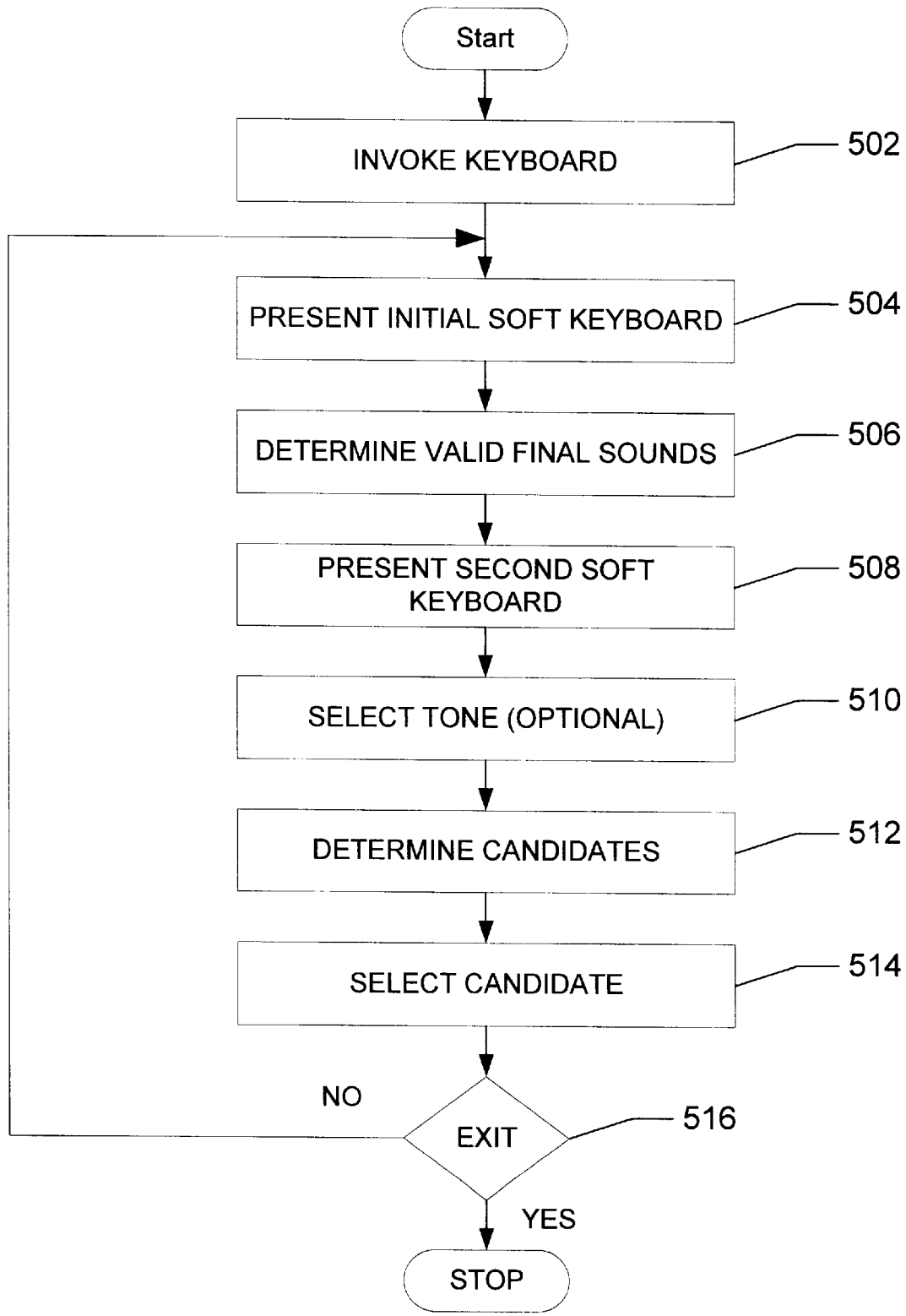
FIG. 5 is a flow chart illustrating an example embodiment of the present invention.
Figure 6:
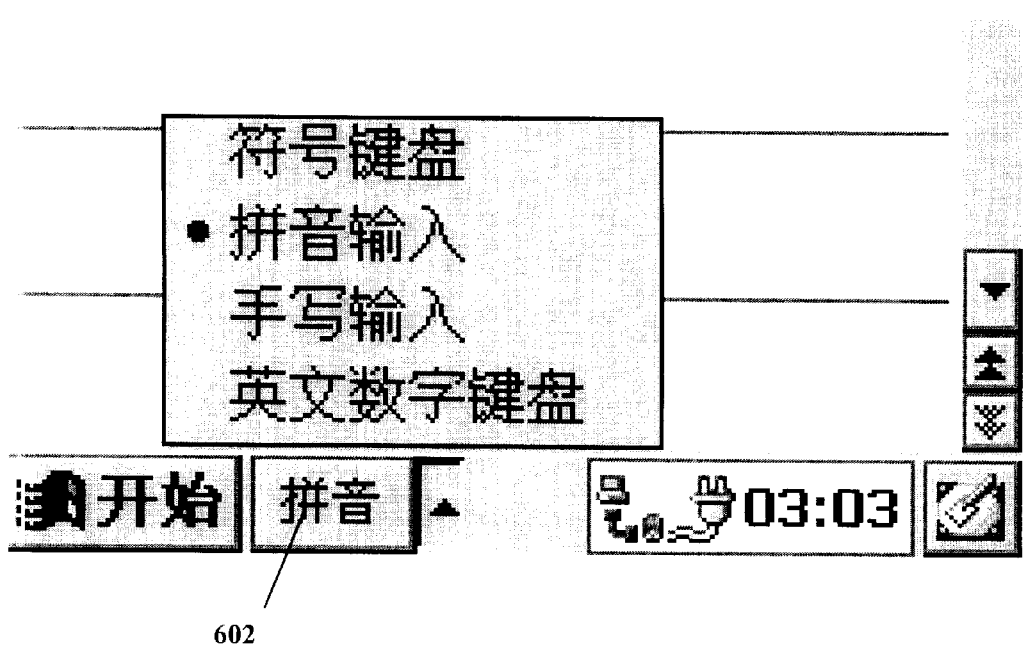
FIG. 6 shows an example menu bar for use in entering characters in a nonalphabetic language, according to a particular embodiment of the present invention.

FIG. 5 is a flowchart illustrating an example method 500 of inputting Chinese characters into a handheld computing device, such as the H/PC 20 of FIG. 1, according to one particular embodiment of the present invention. To input characters in this way, the user first invokes the double-spelling soft keyboard, as shown in a block 502 of FIG. 5. An example button for invoking the double-spelling soft keyboard is depicted at reference numeral 602 in FIG. 6. Internally, the H/PC 20 initializes a Pinyin string that contains the Pinyin representation input by the user. Because no sounds have been entered at this point, the Pinyin string is initially empty.

Figure 7:
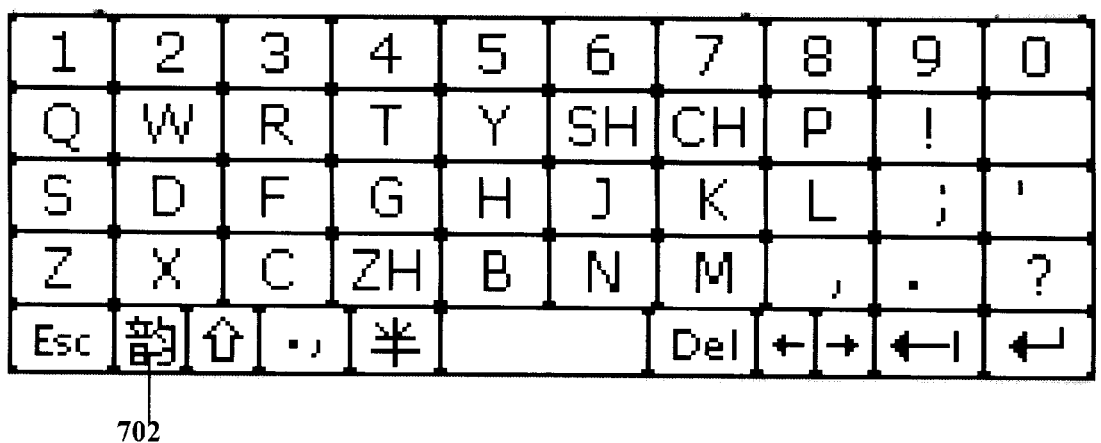
FIG. 7 depicts an example layout for an initial soft keyboard.

When the double-spelling soft keyboard is invoked, the H/PC 20 initially presents the user with an initial soft keyboard that offers a choice of initial sounds, as depicted at a block 504. FIG. 7 depicts an example layout for the initial soft keyboard. The soft keyboard also includes a shortcut key 702 that is used for inputting certain Chinese characters that do not have an initial or consonant sound. The H/PC 20 then appends a string representing the selected initial sound, if any, to the Pinyin string.

After a key is selected from the initial soft keyboard, the H/PC 20 determines, in a particular implementation, which final sounds will form a valid combination with the initial sound at a block 506. In this context, an initial sound and a final sound make a valid combination if, considered together, they form a Pinyin representation that maps to at least one Chinese character. To determine which initial sound-final sound combinations are valid, the H/PC 20 consults a table, an example of which is depicted in FIG. 8.

Next, as shown at a block 508, a second soft keyboard appears that presents a choice of selected final sounds based on which key of the initial soft keyboard was selected. FIG. 9 shows an example layout of the second soft keyboard. In the layout of FIG. 9, certain keys are unshaded, while others are shaded. The unshaded keys are those that form valid combinations with the initial sound selected using the first soft keyboard. The shaded keys, on the other hand, represent final sounds that do not form valid combinations with the initial sound, and are disabled. In the particular example depicted in FIG. 9, the initial sound was "Y." The layout of FIG. 9 informs the user that, for example, "yang" and "yuan" are valid combinations, while "yiang" and "yiu" are not. If the shortcut key 702 was selected, the second soft keyboard displays enabled keys corresponding to final or vowel sounds that constitute valid Pinyin representations on their own. A string representing the selected final sound is appended to the Pinyin string.

Optionally, selecting the final sound causes the H/PC 20 to present the user with a third soft keyboard for selecting the tone of the character, as depicted at a block 510 of FIG. 5. FIG. 10 shows an example layout of this third soft keyboard, which appears substantially similar to the second soft keyboard with the exception of tone keys 1002. The third soft keyboard optionally also includes a determination key (not shown) that allows the user to omit selecting a tone. If the user selects a tone, a string representing the selected tone, e.g., a number, is appended to the Pinyin string.

Tone information can alternatively be conveyed using the number keys 1, 2, 3, 4, and 5 of the first soft keyboard. In a particular implementation, after the final sound is selected, the first soft keyboard is presented. Selecting an initial sound from this first soft keyboard begins the input process for another character. Selecting one of the number keys, however, selects the tone of the current character, rather than beginning the input process for another character. After the tone is selected, the first soft keyboard remains, allowing the user to input another character.

After the initial sound, the final sound, and/or the tone are input, the H/PC 20 determines which characters the user most likely wishes to input based on their combination. This process is illustrated at blocks 512 and 514 of FIG. 5. Specifically, the Pinyin string, which consists of a final sound and possibly an initial sound and/or a tone, is output to a prediction module that consults a dictionary to determine the character or characters corresponding to the Pinyin string, as depicted at a block 512.

Next, at a block 514, the desired character is selected from a set of candidates or homophones. The selection process can be implemented in at least two different ways. First, selection can be automatically performed based on contextual information, such as previously input characters, and other linguistic patterns, e.g., a statistical language model. Based on this information, the H/PC 20 automatically predicts which candidate is most likely to be the intended character. The H/PC 20 generates a list of most likely candidates, sorted in order of probability. These candidates are typically homophones that have the same initial and final sounds. If characters are input without tonal information, candidates that have the same initial and final sounds are considered homophones, even if they would have different tones. On the other hand, if characters are input with tonal information, then candidates must also have the same tone to be considered homophones.

Figure 11:
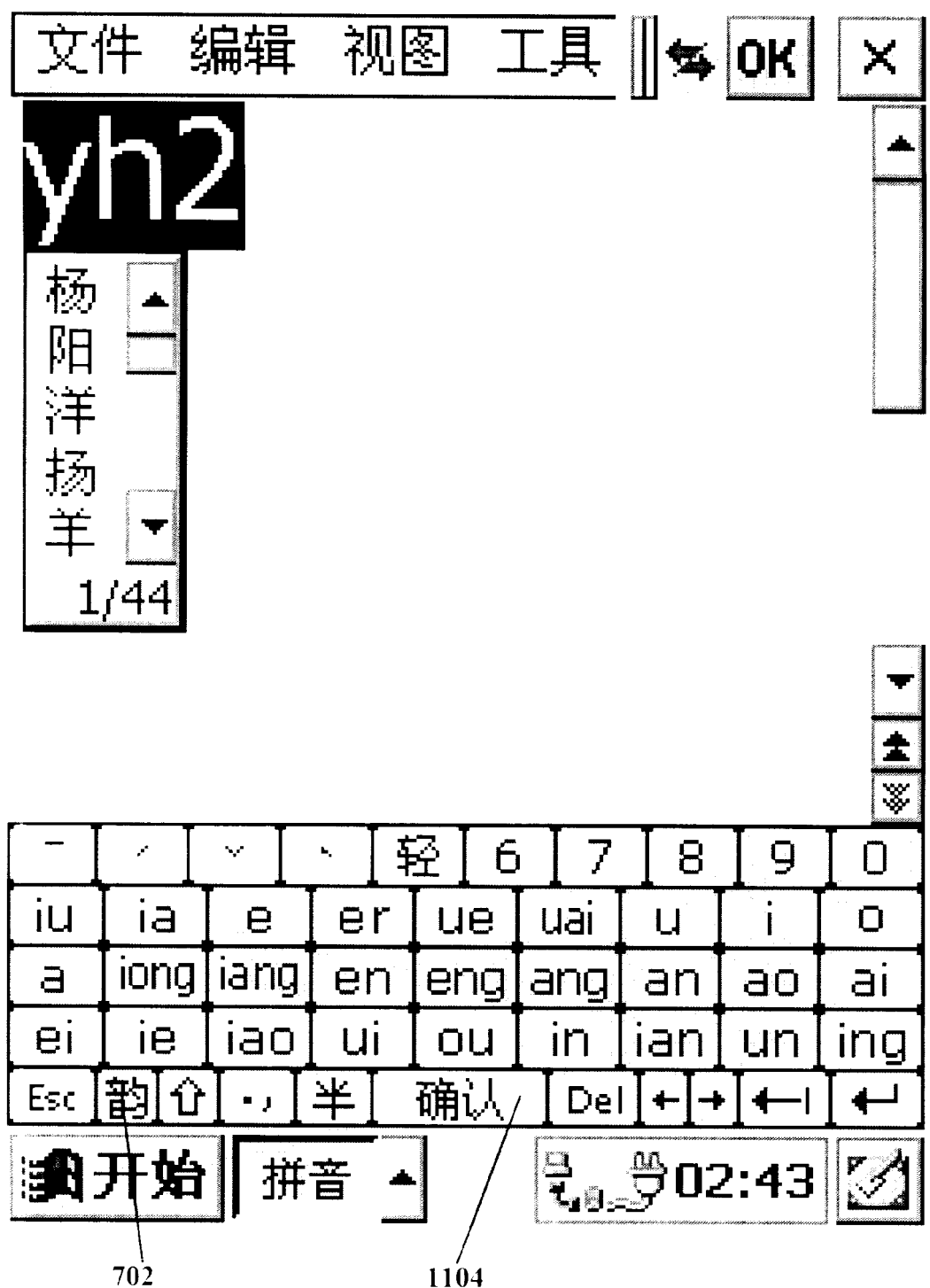
FIG. 11 depicts an example pull-down window for selecting a particular character from a list of candidates.

As an alternative, instead of predicting which candidate is the most likely choice, the H/PC 20 can simply present the list of candidates to the user, who selects the desired character from the list. FIG. 11 depicts an example candidate list, which is presented in a pull-down menu 1102. To select the desired character, the user either chooses from the list or confirms the first or most likely candidate using a confirm button 1104. If the intended character was automatically selected in connection with block 514, the H/PC 20 stores a history of correction patterns, i.e., when the user corrects the choice of the most likely candidate, and which alternative choices are selected in those cases. In this manner, the H/PC 20 can learn the user's usage patterns and intelligently adjust its future selections of most likely candidates appropriately.

After the correct character is selected, flow proceeds to a block 516, at which the H/PC 20 determines whether the user wishes to stop entering Chinese characters. If so, the process ends. If, on the other hand, the user wishes to enter additional characters, the Pinyin string is again initialized to an empty string and execution continues at block 504.

Figure 12:
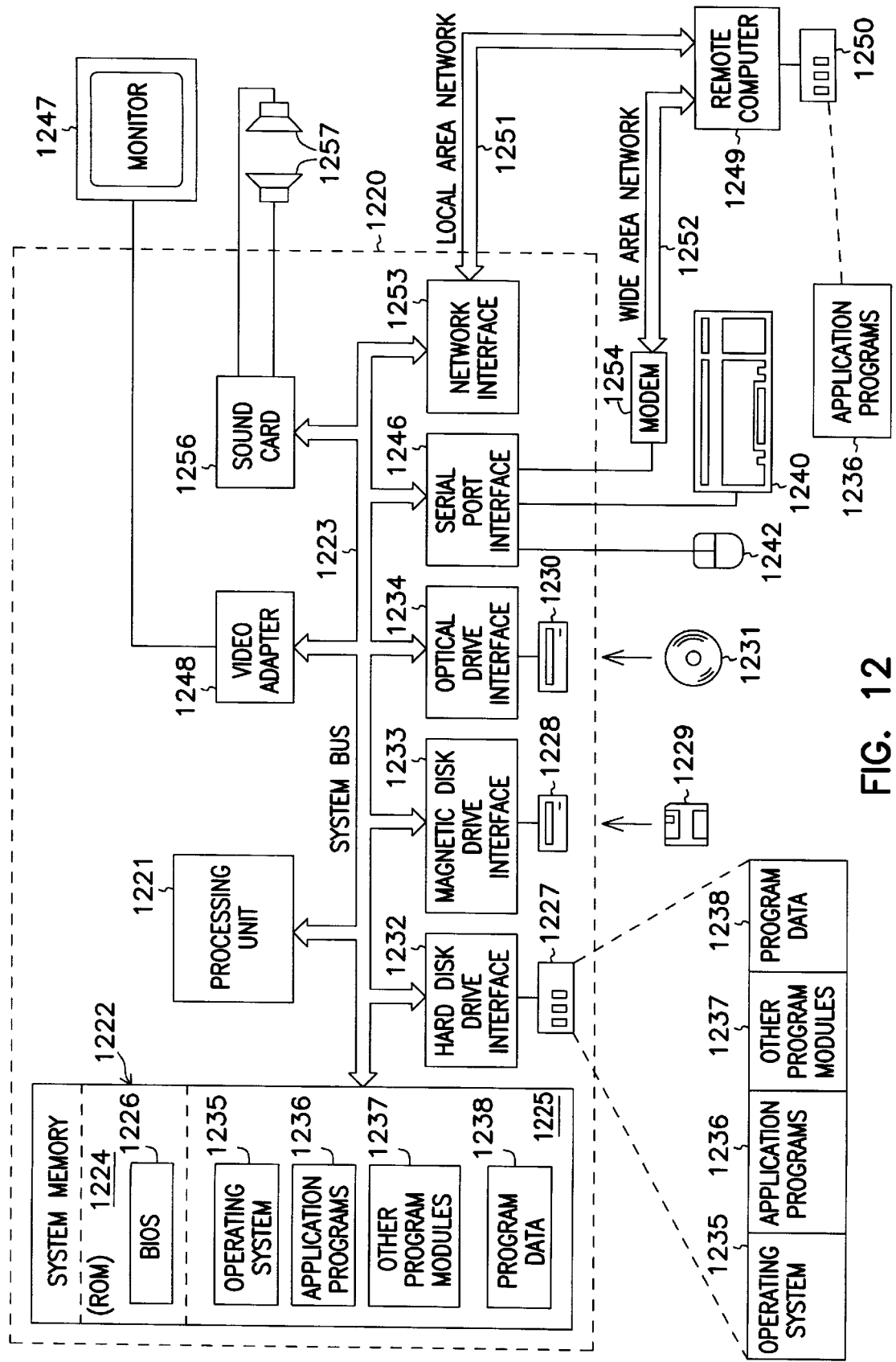
FIG. 12 illustrates a simplified overview of an example embodiment of a computing environment for the present invention.

According to another embodiment of the present invention, a double-spelling soft keyboard is implemented as a desktop IME for use in conjunction with a desktop computing environment. FIG. 12 illustrates a hardware and operating environment in conjunction with which this embodiment of the invention may be practiced. The description of FIG. 12 is intended to provide a brief, general description of suitable computer hardware and a suitable computing environment with which the invention may be implemented. Although not required, this embodiment is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 12 shows a general-purpose computing or information-handling system 1280. This embodiment includes a general purpose computing device such as personal computer (PC) 1220, that includes processing unit 1221, a system memory 1222, and a system bus 1223 that operatively couples the system memory 1222 and other system components to processing unit 1221. There may be only one or there may be more than one processing unit 1221, such that the processor computer 1220 comprises a single central-processing unit (CPU), or a plurality of processing units, commonly referred to as a parallel processing environment. The computer 1220 may be a conventional computer, a distributed computer, or any other type of computer; the invention is not so limited.

In other embodiments other configurations are used in PC 1220. System bus 1223 may be any of several types, including a memory bus or memory controller, a peripheral bus, and a local bus, and may use any of a variety of bus architectures. The system memory 1222 may also be referred to as simply the memory, and it includes read-only memory (ROM) 1224 and random-access memory (RAM) 1225. A basic input/output system (BIOS) 1226, stored in ROM 1224, contains the basic routines that transfer information between components of personal computer 1220. BIOS 1226 also contains start-up routines for the system.

Personal computer 1220 further includes hard disk drive 1227 having one or more magnetic hard disks (not shown) onto which data is stored and retrieved for reading from and writing to hard-disk-drive interface 1232, magnetic disk drive 1228 for reading from and writing to a removable magnetic disk 1229, and optical disk drive 1230 for reading from and/or writing to a removable optical disk 1231 such as a CD-ROM, DVD or other optical medium. Hard disk drive 1227, magnetic disk drive 1228, and optical disk drive 1230 are connected to system bus 1223 by a hard-disk drive interface 1232, a magnetic-disk drive interface 1233, and an optical-drive interface 1234, respectively. The drives 1227, 1228, and 1230 and their associated computer-readable media 1229, 1231 provide nonvolatile storage of computer-readable instructions, data structures, program modules and other data for personal computer 1220. Although the exemplary environment described herein employs a hard disk, a removable magnetic disk 1229 and a removable optical disk 1231, those skilled in the art will appreciate that other types of computer-readable media which can store data accessible by a computer may also be used in the exemplary operating environment. Such media may include magnetic tape cassettes, flash-memory cards, digital video disks (DVD), Bernoulli cartridges, RAMs, ROMs, and the like.

In various embodiments, program modules are stored on the hard disk drive 1227, magnetic disk 1229, optical disk 1231, ROM 1224 and/or RAM 1225 and may be moved among these devices, e.g., from hard disk drive 1227 to RAM 1225. Program modules include operating system 1235, one or more application programs 1236, other program modules 1237, and/or program data 1238. A user may enter commands and information into personal computer 1220 through input devices such as a keyboard 1240 and a pointing device 1242. Other input devices (not shown) for various embodiments include one or more devices selected from a microphone, joystick, game pad, satellite dish, scanner, or the like. These and other input devices are often connected to the processing unit 1221 through a serial-port interface 1246 coupled to system bus 1223, but in other embodiments they are connected through other interfaces not shown in FIG. 12, such as a parallel port, a game port, or a universal serial bus (USB) interface. A monitor 1247 or other display device also connects to system bus 1223 via an interface such as a video adapter 1248. In some embodiments, one or more speakers 1257 or other audio output transducers are driven by sound adapter 1256 connected to system bus 1223. In some embodiments, in addition to the monitor 1247, system 1280 includes other peripheral output devices (not shown) such as a printer or the like.

In some embodiments, personal computer 1220 operates in a networked environment using logical connections to one or more remote computers such as remote computer 1249. Remote computer 1249 may be another personal computer, a server, a router, a network PC, a peer device, or other common network node. Remote computer 1249 typically includes many or all of the components described above in connection with personal computer 1220; however, only a storage device 1250 is illustrated in FIG. 12. The logical connections depicted in FIG. 12 include local-area network (LAN) 1251 and a wide-area network (WAN) 1252, both of which are shown connecting PC 20 to remote computer 1249; typical embodiments would only include one or the other. Such networking environments are commonplace in offices, enterprise-wide computer networks, intranets and the Internet.

When placed in a LAN networking environment, PC 1220 connects to local network 1251 through a network interface or adapter 1253. When used in a WAN networking environment such as the Internet, PC 1220 typically includes modem 1254 or other means for establishing communications over network 1252. Modem 1254 may be internal or external to PC 1220 and connects to system bus 1223 via serial-port interface 1246 in the embodiment shown. In a networked environment, program modules depicted as residing within PC 1220 or portions thereof may be stored in remote-storage device 1250. Of course, the network connections shown are illustrative, and other means of establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members (variables) and member functions (methods) that operate on that data into a single entity called a class. Object-oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in some embodiments.

An interface is a group of related functions that are organized into a named unit. Some identifier may uniquely identify each interface. Interfaces have no instantiation; that is, an interface is a definition only without the executable code needed to implement the methods that are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object-oriented programming environment.

In the desktop IME implementation, each soft key is mapped to a key on the keyboard 1240 rather than to an area of a graphical soft keyboard. The monitor 1247 or other display device presents the user with a graphical representation of the soft keyboard. This graphical representation serves two purposes. First, the user can use the graphical representation as a reminder of the mapping scheme used by the soft keyboard. Thus, the user can input Pinyin representations accurately. Alternatively, the user can use the graphical representation itself to input Pinyin representations using a mouse or other pointing device 1242, e.g., by "clicking" on keys on the graphical representation of the soft keyboard.

Characters are input in a similar manner as with the embodiments described above in connection with FIGS. 1–11. First, the user is presented with an initial soft keyboard, an example layout of which is depicted in FIG. 13. This layout includes a choice of initial sounds, as well as a number of function keys. A language switching key 1302 enables the user to switch between inputting Chinese characters and inputting standard alphabetic characters. A width switching key 1304 allows the user to switch between inputting half-width and full-width Chinese characters. A simplified/traditional switching key 1306 allows the user to switch between entering simplified Chinese characters and traditional Chinese characters. While the layout of FIG. 13 is depicted as including all three of these function keys, it should be appreciated that other sets of function keys, including fewer or more function keys, can be implemented. Pressing the Shift key on the initial soft keyboard causes the keyboard mapping to be shifted as it is in many conventional applications, e.g., to the layout illustrated in FIG. 14.

Selecting a key from the initial soft keyboard causes a final soft keyboard to be displayed. FIG. 15 shows an example of a complete mapping between alphabetic keys and final sounds. As in the implementations of FIGS. 1–11, the system only enables keys that map to final sounds that form valid combinations with the selected initial sound. Thus, for example, assuming the initial sound "W" was selected, the final soft keyboard appears as shown in FIG. 16.

As the initial sound, final sound, and/or tone are selected, the system builds a Pinyin string as described above in connection with FIGS. 1–11. This Pinyin string is then submitted to a prediction module that consults a dictionary to determine which character or characters correspond to the Pinyin string. This determination may also be affected by contextual information or other linguistic patterns. As described above, the system can also learn the user's usage patterns and use them to predict which candidates are most likely to be selected by the particular user. The most likely candidates are presented to the user, optionally sorted in order of likelihood, and the user either selects a candidate or simply confirms the default selection of the most likely candidate.

By reducing the number of keystrokes involved in inputting Chinese characters to two or three, the present invention significantly improves input speed over conventional techniques for inputting such characters or their Pinyin representations. Further, accuracy is improved over conventional handwriting recognition techniques that require multiple strokes for each character.

In addition, the need to memorize keyboard mappings is avoided. Duplicate mapping of keys to sounds is also avoided, as each key uniquely maps to one initial sound on the first soft keyboard or one final sound on the second soft keyboard. This scheme is particularly advantageous for use within the size constraints of H/PC environments.

Thus, while the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms such as a computer program encoded in a machine readable medium, such as a CD-ROM, magnetic medium, ROM or RAM, or in an electronic signal. Further, as used in the claims herein, the term "module" shall mean any hardware or software component, or any combination thereof.

What is claimed is:

1. A method for inputting a desired character in a non-alphabetic language, comprising:

presenting a user with a graphical representation of an initial soft keyboard having a plurality of first keys, at least some of the first keys representing initial sounds;

presenting the user with a graphical representation of a final soft keyboard having a plurality of second keys, at least some of the second keys representing final sounds, wherein each of the initial and final sounds can be represented by a single key, respectively, on the initial soft keyboard and final soft keyboard; and determining the desired character at least in part as a function of a user selection of one of the first keys and one of the second keys.

2. A method, according to claim 1, wherein the graphical representations are displayed on a touch-sensitive screen, and wherein the user selections are received using the touch-sensitive screen.

3. A method, according to claim 1, wherein the graphical representations are displayed on a monitor, and wherein the user selections are received using at least one of a keyboard and a pointing device.

4. A method, according to claim 1, wherein one of the first keys is a shortcut key for inputting characters lacking an initial sound.

5. A method, according to claim 1, further comprising selectively enabling a second key if the final sound represented by the second key forms a valid combination with the initial sound represented by the selected first key.

6. A method, according to claim 5, further comprising referencing a table to determine which final sounds form valid combinations with the initial sound represented by the selected first key.

7. A method, according to claim 1, further comprising:
receiving a user selection of a tone; and
determining the desired character in part as a function of the selected tone.

8. A method, according to claim 7, further comprising presenting the user with a graphical representation of a tonal keyboard for selecting the tone.

9. A method, according to claim 7, wherein the user selects the tone using numeric keys of the final soft keyboard.

10. A method, according to claim 1, further comprising consulting a dictionary to determine the desired character.

11. A method, according to claim 1, further comprising determining the desired character in part as a function of at least one of contextual information and linguistic patterns.

12. A method, according to claim 1, further comprising determining the desired character using a statistical language model.

13. A method, according to claim 1, further comprising:
presenting the user with a plurality of candidates determined as a function of the initial sound corresponding to the selected first key and the final sound corresponding to the selected second key; and
receiving a user selection of one of the candidates as the desired character.

14. A method, according to claim 13, further comprising:
storing a history of user selections of desired characters; and
using the history in future determinations of desired characters.

15. A method, according to claim 1, further comprising:
constructing a string at least in part as a function of the user selection of the first and second keys; and
determining the desired character as a function of the string.

16. A method, according to claim 15, further comprising constructing the string in part as a function of a user selection of a tone.

17. A method, according to claim 1, wherein the non-alphabetic language is Chinese.

18. A method, according to claim 1, wherein each of the second keys assumes one of an enabled state and a disabled state, the assumed state being selected as a function of a user selection of one of the first keys.

19. A method for inputting a desired character in a non-alphabetic language, comprising:
presenting a user with a graphical representation of an initial soft keyboard having a plurality of first keys, at least some of the first keys representing initial sounds;
presenting the user with a graphical representation of a final soft keyboard having a plurality of second keys, at least some of the second keys representing final sounds, wherein each of the initial and final sounds can be represented by a single key, respectively, on the initial soft keyboard and final soft keyboard;
constructing a string at least in part as a function of a user selection of the first and second keys; and
using a statistical language model to determine the desired character at least in part as a function of the string.

20. A method, according to claim 19, further comprising:
receiving a user selection of a tone; and
determining the desired character in part as a function of the selected tone.

21. A method, according to claim 19, wherein the graphical representations are displayed on a touch-sensitive screen, and wherein the user selections are received using the touch-sensitive screen.

22. A method, according to claim 19, wherein the graphical representations are displayed on a monitor, and wherein the user selections are received using at least one of a keyboard and a pointing device.

23. A method, according to claim 19, wherein each of the second keys assumes one of an enabled state and a disabled state, the assumed state being selected as a function of a user selection of one of the first keys.

24. A handheld computing device comprising a touch-sensitive screen and configured to receive input of a desired character in a non-alphabetic language by:
displaying on the touch-sensitive screen a graphical representation of an initial soft keyboard having a plurality of first keys, at least some of the first keys representing initial sounds;
receiving a user selection of one of the first keys using the touch-sensitive screen;
displaying on the touch-sensitive screen a graphical representation of a final soft keyboard having a plurality of second keys, at least some of the second keys representing final sounds, wherein each of the initial and final sounds can be represented by a single key, respectively, on the initial soft keyboard and final soft keyboard;
receiving a user selection of one of the second keys using the touch-sensitive screen; and
determining the desired character at least in part as a function of a user selection of one of the first keys and one of the second keys.

25. A handheld computing device, according to claim 24, wherein one of the first keys is a shortcut key for inputting characters lacking an initial sound.

26. A handheld computing device, according to claim 24, further configured to selectively enable a second key if the final sound represented by the second key forms a valid combination with the initial sound represented by the selected first key.

27. A handheld computing device, according to claim 26, further configured to reference a table to determine which final sounds form valid combinations with the initial sound represented by the selected first key.

28. A handheld computing device, according to claim 24, further configured to:
receive a user selection of a tone; and
determine the desired character in part as a function of the selected tone.

29. A handheld computing device, according to claim 28, further configured to display on the touch-sensitive screen a graphical representation of a tonal keyboard for selecting the tone.

30. A handheld computing device, according to claim 28, wherein the user selects the tone using numeric keys of the final soft keyboard.

31. A handheld computing device, according to claim 24, further configured to consult a dictionary to determine the desired character.

32. A handheld computing device, according to claim 24, further configured to determine the desired character in part as a function of at least one of contextual information and linguistic patterns.

33. A handheld computing device, according to claim 24, further configured to determine the desired character using a statistical language model.

34. A handheld computing device, according to claim 24, further configured to:
 display on the touch-sensitive screen a plurality of candidates determined as a function of the initial sound corresponding to the selected first key and the final sound corresponding to the selected second key; and
 receive, using the touch-sensitive screen, a user selection of one of the candidates as the desired character.

35. A handheld computing device, according to claim 34, further configured to:
 store a history of user selections of desired characters; and
 use the history in future determinations of desired characters.

36. A handheld computing device, according to claim 24, further configured to:
 construct a string at least in part as a function of the user selection of the first and second keys; and
 determine the desired character as a function of the string.

37. A handheld computing device, according to claim 36, further configured to construct the string in part as a function of a user selection of a tone.

38. A handheld computing device, according to claim 24, wherein the non-alphabetic language is Chinese.

39. A handheld computing device, according to claim 24, wherein each of the second keys assumes one of an enabled state and a disabled state, the assumed state being selected as a function of a user selection of one of the first keys.

40. A handheld computing device comprising a touch-sensitive screen and configured to receive input of a desired character in a non-alphabetic language by:
 displaying on the touch-sensitive screen a graphical representation of an initial soft keyboard having a plurality of first keys, at least some of the first keys representing initial sounds;
 receiving a user selection of one of the first keys using the touch-sensitive screen;
 displaying on the touch-sensitive screen a graphical representation of a final soft keyboard having a plurality of second keys, at least some of the second keys representing final sounds, wherein each of the initial and final sounds can be represented by a single key, respectively, on the initial soft keyboard and final soft keyboard;
 receiving a user selection of one of the second keys using the touch-sensitive screen;
 constructing a string at least in part as a function of a user selection of the first and second keys; and
 using a statistical language model to determine the desired character at least in part as a function of the string.

41. A handheld computing device, according to claim 40, further configured to:
 receive a user selection of a tone; and
 determine the desired character in part as a function of the selected tone.

42. A handheld computing device, according to claim 40, wherein each of the second keys assumes one of an enabled state and a disabled state, the assumed state being selected as a function of a user selection of one of the first keys.

43. For use in receiving input of a desired character in a non-alphabetic language, a computer arrangement configured to perform steps comprising:
 displaying a graphical representation of an initial soft keyboard having a plurality of first keys, at least some of the first keys representing initial sounds;
 displaying a graphical representation of a final soft keyboard having a plurality of second keys, at least some of the second keys representing final sounds, wherein each of the initial and final sounds can be represented by a single key, respectively, on the initial soft keyboard and final soft keyboard; and
 determining the desired character at least in part as a function of a user selection of one of the first keys and one of the second keys.

44. A computer arrangement, according to claim 43, wherein one of the first keys is a shortcut key for inputting characters lacking an initial sound.

45. A computer arrangement, according to claim 43, further configured to selectively enable a second key if the final sound represented by the second key forms a valid combination with the initial sound represented by the selected first key.

46. A computer arrangement, according to claim 45, further configured to reference a table to determine which final sounds form valid combinations with the initial sound represented by the selected first key.

47. A computer arrangement, according to claim 43, further configured to:
 receive a user selection of a tone; and
 determine the desired character in part as a function of the selected tone.

48. A computer arrangement, according to claim 47, further configured to display a graphical representation of a tonal keyboard for selecting the tone.

49. A computer arrangement, according to claim 47, wherein the user selects the tone using numeric keys of the final soft keyboard.

50. A computer arrangement, according to claim 43, further configured to consult a dictionary to determine the desired character.

51. A computer arrangement, according to claim 43, further configured to determine the desired character in part as a function of at least one of contextual information and linguistic patterns.

52. A computer arrangement, according to claim 43, further configured to determine the desired character using a statistical language model.

53. A computer arrangement, according to claim 43, further configured to:
 display on the touch-sensitive screen a plurality of candidates determined as a function of the initial sound corresponding to the selected first key and the final sound corresponding to the selected second key; and
 receive, using the touch-sensitive screen, a user selection of one of the candidates as the desired character.

54. A computer arrangement, according to claim 53, further configured to:
 store a history of user selections of desired characters; and
 use the history in future determinations of desired characters.

55. A computer arrangement, according to claim 43, further configured to:
 construct a string at least in part as a function of the user selection of the first and second keys; and
 determine the desired character as a function of the string.

56. A computer arrangement, according to claim 55, further configured to construct the string in part as a function of a user selection of a tone.

57. A computer arrangement, according to claim 43, wherein the non-alphabetic language is Chinese.

58. A computer arrangement, according to claim 43, wherein each of the second keys assumes one of an enabled state and a disabled state, the assumed state being selected as a function of a user selection of one of the first keys.

59. For use in receiving input of a desired character in a non-alphabetic language, a computer arrangement configured to perform steps comprising:

presenting a user with a graphical representation of an initial soft keyboard having a plurality of first keys, at least some of the first keys representing initial sounds;

presenting the user with a graphical representation of a final soft keyboard having a plurality of second keys, at least some of the second keys representing final sounds, wherein each of the initial and final sounds can be represented by a single key, respectively, on the initial soft keyboard and final soft keyboard;

constructing a string at least in part as a function of a user selection of the first and second keys; and using a statistical language model to determine the desired character at least in part as a function of the string.

60. A computer arrangement, according to claim 59, further configured to:

receive a user selection of a tone; and determine the desired character in part as a function of the selected tone.

61. A computer arrangement, according to claim 59, wherein each of the second keys assumes one of an enabled state and a disabled state, the assumed state being selected as a function of a user selection of one of the first keys.

62. For use in receiving input of a desired character in a non-alphabetic language, a computer readable medium having computer-executable instructions for performing steps comprising:

displaying a graphical representation of an initial soft keyboard having a plurality of first keys, at least some of the first keys representing initial sounds;

displaying a graphical representation of a final soft keyboard having a plurality of second keys, at least some of the second keys representing final sounds, wherein each of the initial and final sounds can be represented by a single key, respectively, on the initial soft keyboard and final soft keyboard; and determining the desired character at least in part as a function of a user selection of one of the first keys and one of the second keys.

63. A computer readable medium, according to claim 62, wherein one of the first keys is a shortcut key for inputting characters lacking an initial sound.

64. A computer readable medium, according to claim 62, having further computer-executable instructions for selectively enabling a second key if the final sound represented by the second key forms a valid combination with the initial sound represented by the selected first key.

65. A computer readable medium, according to claim 64, having further computer-executable instructions for referencing a table to determine which final sounds form valid combinations with the initial sound represented by the selected first key.

66. A computer readable medium, according to claim 62, having further computer-executable instructions for:

receiving a user selection of a tone; and determining the desired character in part as a function of the selected tone.

67. A computer readable medium, according to claim 66, having further computer-executable instructions for displaying a graphical representation of a tonal keyboard for selecting the tone.

68. A computer readable medium, according to claim 66, wherein the user selects the tone using numeric keys of the final soft keyboard.

69. A computer readable medium, according to claim 62, having further computer-executable instructions for consulting a dictionary to determine the desired character.

70. A computer readable medium, according to claim 62, having further computer-executable instructions for determining the desired character in part as a function of at least one of contextual information and linguistic patterns.

71. A computer readable medium, according to claim 62, having further computer-executable instructions for determining the desired character using a statistical language model.

72. A computer readable medium, according to claim 62, having further computer-executable instructions for:

displaying on a touch-sensitive screen a plurality of candidates determined as a function of the initial sound corresponding to the selected first key and the final sound corresponding to the selected second key; and receiving, using the touch-sensitive screen, a user selection of one of the candidates as the desired character.

73. A computer readable medium, according to claim 72, having further computer-executable instructions for:

storing a history of user selections of desired characters; and using the history in future determinations of desired characters.

74. A computer readable medium, according to claim 62, having further computer-executable instructions for:

constructing a string at least in part as a function of the user selection of the first and second keys; and determining the desired character as a function of the string.

75. A computer readable medium, according to claim 74, having further computer-executable instructions for constructing the string in part as a function of a user selection of a tone.

76. A computer readable medium, according to claim 62, wherein the non-alphabetic language is Chinese.

77. A computer readable medium, according to claim 62, wherein each of the second keys assumes one of an enabled state and a disabled state, the assumed state being selected as a function of a user selection of one of the first keys.

78. For use in receiving input of a desired character in a non-alphabetic language, a computer readable medium having computer-executable instructions for performing steps comprising:

presenting a user with a graphical representation of an initial soft keyboard having a plurality of first keys, at least some of the first keys representing initial sounds;

presenting the user with a graphical representation of a final soft keyboard having a plurality of second keys, at least some of the second keys representing final sounds, wherein each of the initial and final sounds can be represented by a single key, respectively, on the initial soft keyboard and final soft keyboard;

constructing a string at least in part as a function of a user selection of the first and second keys; and using a statistical language model to determine the desired character at least in part as a function of the string.

79. A computer readable medium, according to claim 78, having further computer-readable instructions for:
  receiving a user selection of a tone; and
  determining the desired character in part as a function of the selected tone.

80. A computer readable medium, according to claim 78, having further computer-executable instructions for:
  displaying the graphical representations on a touch-sensitive screen; and
  receiving the user selections using the touch-sensitive screen.

81. A computer readable medium, according to claim 78, having further computer-executable instructions for:
  displaying the graphical representations on a monitor; and
  receiving the user selections using at least one of a keyboard and a pointing device.

82. A computer readable medium, according to claim 78, wherein each of the second keys assumes one of an enabled state and a disabled state, the assumed state being selected as a function of a user selection of one of the first keys.

* * * * *